May 1, 1934.　　　L. A. ROBILLARD　　　1,957,078

MACHINE FOR SEPARATING JIG-SAW PUZZLE PIECES

Filed March 29, 1933　　　2 Sheets-Sheet 1

INVENTOR
L. A. ROBILLARD
BY J. T. O'Connell
ATTORNEY

May 1, 1934.  L. A. ROBILLARD  1,957,078

MACHINE FOR SEPARATING JIG-SAW PUZZLE PIECES

Filed March 29, 1933   2 Sheets-Sheet 2

INVENTOR
L. A. ROBILLARD
BY J. D. O'Connell
ATTORNEY

Patented May 1, 1934

1,957,078

UNITED STATES PATENT OFFICE 1,957,078

MACHINE FOR SEPARATING JIG-SAW PUZZLE PIECES

Louis A. Robillard, Montreal, Quebec, Canada, assignor to John Lovell & Son, Limited, Montreal, Quebec, Canada Application March 29, 1933, Serial No. 663,336

6 Claims. (Cl. 164—34)

This invention comprises a machine for completing the separation of the component pieces of a jig-saw puzzle following partial separation of the pieces by the usual die cutting operation.

The object of this invention is to provide a simple and efficient machine that has a high output capacity and comprises a few relatively few simple parts capable of being manufactured and assembled at a compartively low cost.

Proceeding now to a more detailed description, reference will be had to the accompanying drawings in which—

Figure 1:
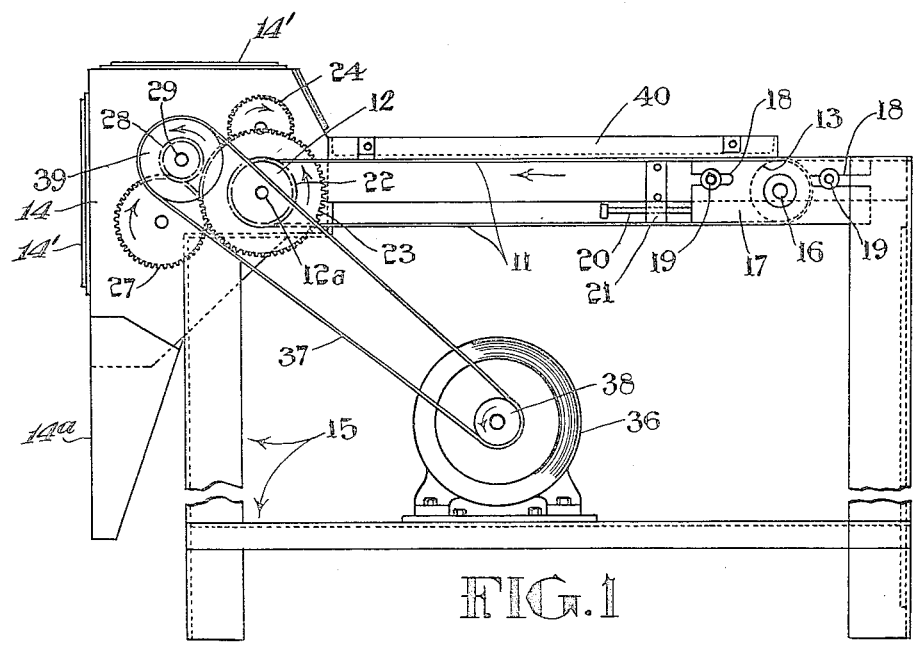
Fig. 1 is a view in side elevation of a machine constructed in accordance with this invention.

Referring more particularly to the drawings, 11 designates an endless belt conveyor carried by rollers 12 and 13, the delivery end of the conveyor which is carried by the roller 12 being housed within a suitable casing 14 attached to the front end of the supporting frame 15. The conveyor roller 13 is journalled in bearings 16 carried by the adjustable bearing supports 17. As here shown, each support 17 comprises a plate having its ends provided with lengthwise extending slots 18 receiving the bolts 19 which support the plate for sliding movement in the lengthwise direction of the conveyor. The forward end of each plate or bearing support 17 is shown engaged by an adjusting screw 20 threaded through the supporting bracket 21 carried by one of the uper side members of the frame 15. By turning these screws 20 the roller 13 may be adjusted to pick up any slack in the conveyor belt 11.

The roller 12 at the delivery end of the conveyor is journalled in the side walls of the casing 14 and is provided with a shaft extension 12a which carries a relatively small fixed gear 22 and a relatively large fixed gear 23. Gear 22 meshes with a similar gear 24 fixed to the shaft of a rotary brush 25 that is also journalled in the side walls of the casing 14 directly above the roller 12.

Figures 4, 5:
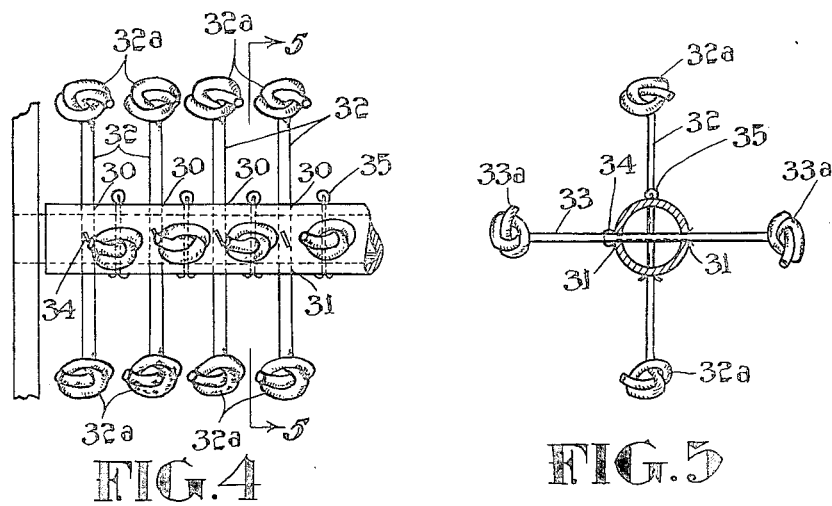
Fig. 4 is a fragmentary view, in front elevation, of a breaker provided in accordance with this invention.
Fig. 5 is a sectional view taken along the line 5—5 of Fig. 4.

Gear 23 meshes with an idler gear 27 which, in turn, meshes with a small pinion 28 fixed to a shaft 29 that is journaled in the casing 14 in front of the delivery end of the belt conveyor 11. As shown more particularly in Figs. 4 and 5, the body portion of the shaft 29 is made hollow and carries two sets of leather strips threaded through the openings 30 and 31 so that the strips 32 of one set extend at right angles with respect to the strips 33 of the companion set, the ends of each strip being knotted as indicated at 32a and 33a and the intermediate portions of the strips being fastened to the shaft 29 by the cotter pins appearing at 34 and 35. As shown to advantage in Figs. 1 and 2, the shaft 29 is driven by a motor 36 through the medium of the belt 37 and the pulleys 38 and 39.

The top, front and rear walls of the casing 14 are provided with glass covered window openings 14' to permit convenient inspection of the parts operating within the casing. It will also be noted that the lower portion of the casing is formed to provide a discharge spout 14a through which the component pieces of the puzzle, after being separated from each other as hereinafter described, are delivered to any suitable form of receptacle not shown) from which they are immediately extracted for packaging purposes.

Figure 2:
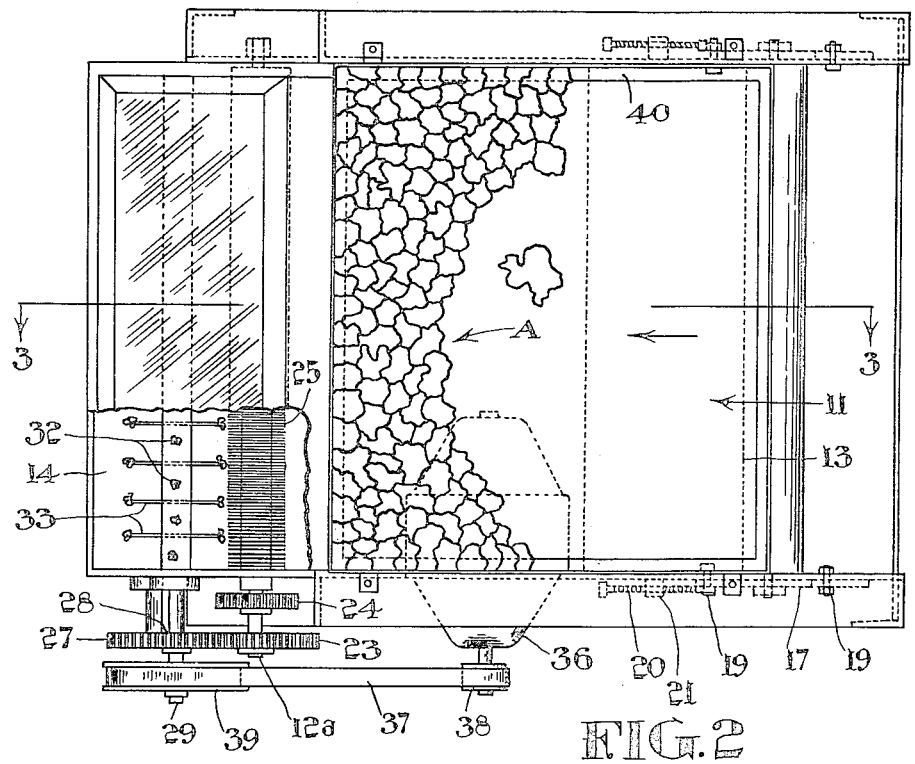
Fig. 2 is a top plan view, partly broken away, to show the interior construction.
Figure 3:
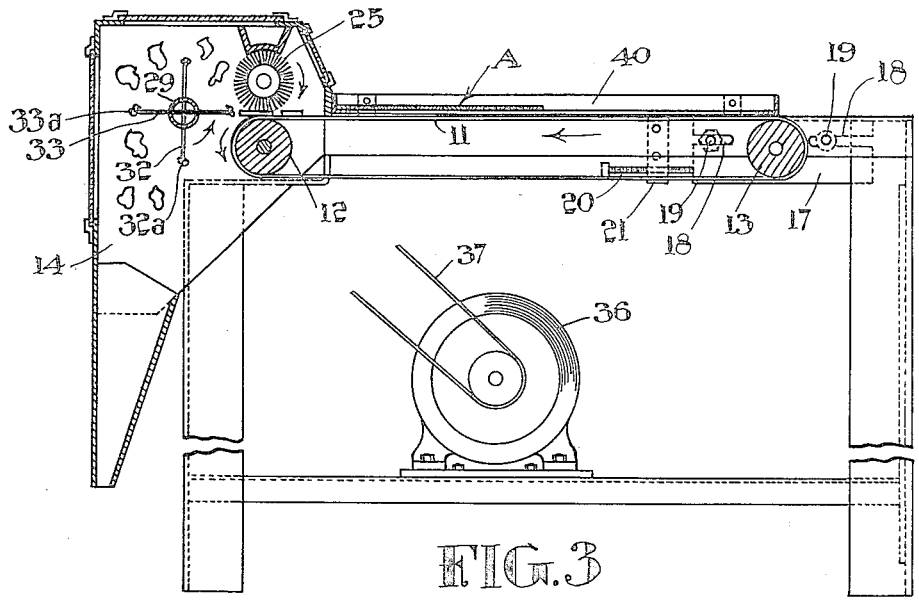
Fig. 3 is a longitudinal sectional view taken substantially along the line 3—3 of Fig. 2.

The manner in which this invention is used will be described with particular reference to Figs. 2 and 3, wherein I have shown a portion of a jig-saw puzzle card indicated by the letter A. This card, after being partially cut through by the usual die-cutting operation, is placed in an open-center rectangular supporting frame 40 mounted above and in spaced relation to the upper flight of the belt conveyor 11. The operator then presses down on the unsupported portions of the card so that pieces of the puzzle are detached, usually in groups of two or more, and fall onto the belt conveyor 11 which travels in the direction indicated by the applied arrow. The detached groups of pieces are thus carried beneath the brush 25 which bears against the upper surfaces of the pieces as they are projected beyond the receiving end of the conveyor and into the path of the leather strips 32 and 33 which, together with the shaft 29, travel in the direction indicated by the adjacent arrow. Thus, as the ends of the pieces project beyond the receiving end of the conveyor they are struck by the knotted ends of the leather strips in such a manner that each piece is effectively freed of other pieces attached thereto. The brush 25 serves, in a sense, as a yielding anvil which co-operates with the leather strips 32 and 33 so that the separation of the pieces of the puzzle is accomplished without any damage to the surface of the pieces.

Having thus fully described what I now consider to be the preferred embodiment of this invention it will be understood that various changes in the construction and arrangement of parts may be resorted to within the scope and spirit of the appended claims.

Having thus described my invention, what I claim is:—

1. A machine for completing the separation of the component pieces of a jig-saw puzzle following partial separation of the pieces by the usual die-cutting operation, comprising an endless belt conveyor on which sections of the puzzle comprising two or more attached pieces are deposited, a plurality of strikers arranged to knock the pieces apart as they are projecting beyond the delivery end of the conveyor and a member above the delivery end of the conveyor adapted to bear yieldingly on said pieces as they reach the end of the conveyor and are engaged by the strikers.

2. A machine as claimed in claim 1 in which the strikers comprise flexible strips fixed to a rotary shaft journalled in front of the delivery end of the casing.

3. A machine as claimed in claim 1 in which the strikers comprise flexible strips threaded through transverse openings formed in a shaft journalled in front of the delivery end of the conveyor, the intermediate portions of the strips being secured in said openings with the ends of the strips projecting a considerable distance beyond the shaft.

4. A machine as claimed in claim 1 in which the strikers comprise flexible strips threaded through transverse openings formed in a shaft journalled in front of the delivery end of the conveyor, the intermediate portions of the strips being secured in said openings with the ends of the strips projecting a considerable distance beyond the shaft, and provided with terminal knots.

5. A machine as claimed in claim 1 in which the last mentioned member comprises a rotary brush.

6. A machine as claimed in claim 1 including a casing enclosing the delivery end of the belt conveyor, the strikers and the last mentioned member.

LOUIS A. ROBILLARD.